United States Patent
Shiraiwa et al.

(10) Patent No.: US 7,779,111 B2
(45) Date of Patent: Aug. 17, 2010

(54) NETWORK DEVICE AND NETWORK DEVICE MANAGING METHOD

(75) Inventors: Mototsugu Shiraiwa, Kanagawa (JP); Harumine Yoshiba, Kanagawa (JP)

(73) Assignee: Panasonic Corporation, Osaka (JP)

( * ) Notice: Subject to any disclaimer, the term of this patent is extended or adjusted under 35 U.S.C. 154(b) by 185 days.

(21) Appl. No.: 12/295,105

(22) PCT Filed: Mar. 29, 2007

(86) PCT No.: PCT/JP2007/056981
§ 371 (c)(1),
(2), (4) Date: Sep. 29, 2008

(87) PCT Pub. No.: WO2007/122973
PCT Pub. Date: Nov. 1, 2007

(65) Prior Publication Data
US 2009/0177762 A1    Jul. 9, 2009

(30) Foreign Application Priority Data
Apr. 12, 2006   (JP) .............................. 2006-109701

(51) Int. Cl.
*G06F 15/173* (2006.01)
(52) U.S. Cl. .................. 709/223; 709/220; 709/228; 709/245; 370/389; 370/401
(58) Field of Classification Search .......... 709/220, 709/223, 228, 245; 370/389, 401
See application file for complete search history.

(56) References Cited

U.S. PATENT DOCUMENTS

| | | | |
|---|---|---|---|
| 7,165,722 B2 * | 1/2007 | Shafer et al. ............... 235/385 |
| 7,272,656 B2 * | 9/2007 | Miyoshi ..................... 709/230 |
| 2002/0172207 A1 * | 11/2002 | Saito et al. ................. 370/400 |
| 2003/0074570 A1 * | 4/2003 | Miyoshi ..................... 713/190 |
| 2004/0111640 A1 * | 6/2004 | Baum ......................... 713/201 |

(Continued)

FOREIGN PATENT DOCUMENTS

JP    2004-254346    9/2004

(Continued)

OTHER PUBLICATIONS

International Search Report for PCT/JP2007/056981; Apr. 20, 2007.

*Primary Examiner*—Oanh Duong
(74) *Attorney, Agent, or Firm*—Pearne & Gordon LLP

(57) ABSTRACT

To explicitly identify network devices without providing a database server using an IPv6 address. An IPv6 address for address management on a network is set in a network device connected to an IPv6 network and the network device keeps and maintains the address. An interface ID 12 of the IPv6 address is composed of a maker ID 13, a management ID 14, a device ID 15, and a function ID 16. Maker information kept and maintained by a maker of the network device is assigned to the maker ID 13 and a number indicating management by a device type is assigned as a number indicating a management system type to a device the management ID 14. The device ID 15 has numbers indicating a device type 17, a product type 18, and a product serial number 19. A number indicating a function of the network device is assigned to the function ID 16.

2 Claims, 13 Drawing Sheets

U.S. PATENT DOCUMENTS

| | | | |
|---|---|---|---|
| 2004/0120266 A1* | 6/2004 | Ko et al. | 370/252 |
| 2004/0184467 A1 | 9/2004 | Watanabe | |
| 2004/0203906 A1* | 10/2004 | Kato et al. | 455/456.1 |
| 2006/0077984 A1* | 4/2006 | Sakai et al. | 370/395.52 |
| 2006/0133373 A1* | 6/2006 | Paik et al. | 370/389 |
| 2006/0146837 A1 | 7/2006 | Atsuki et al. | |
| 2006/0159100 A1* | 7/2006 | Droms et al. | 370/395.2 |
| 2006/0165015 A1* | 7/2006 | Melick et al. | 370/254 |
| 2007/0081544 A1* | 4/2007 | Sakai et al. | 370/401 |
| 2008/0307079 A1* | 12/2008 | Choi et al. | 709/223 |

FOREIGN PATENT DOCUMENTS

JP     2004-289782     10/2004

* cited by examiner

FIG. 13A

| 4 BITS | 8 BITS | 4 BITS | 7 BITS | 5 BITS | 12 BITS |
|---|---|---|---|---|---|
| MANAGEMENT ID | LOCATION NAME TYPE | FUNCTION ID | FLOOR INFORMATION | DIVISION INFORMATION | DEVICE NUMBER |

FIG. 13B

| 4 BITS | 8 BITS | 7 BITS | 4 BITS | 5 BITS | 12 BITS |
|---|---|---|---|---|---|
| MANAGEMENT ID | LOCATION NAME TYPE | FLOOR INFORMATION | FUNCTION ID | DIVISION INFORMATION | DEVICE NUMBER |

FIG. 13C

| 4 BITS | 8 BITS | 7 BITS | 5 BITS | 4 BITS | 12 BITS |
|---|---|---|---|---|---|
| MANAGEMENT ID | LOCATION NAME TYPE | FLOOR INFORMATION | DIVISION INFORMATION | FUNCTION ID | DEVICE NUMBER |

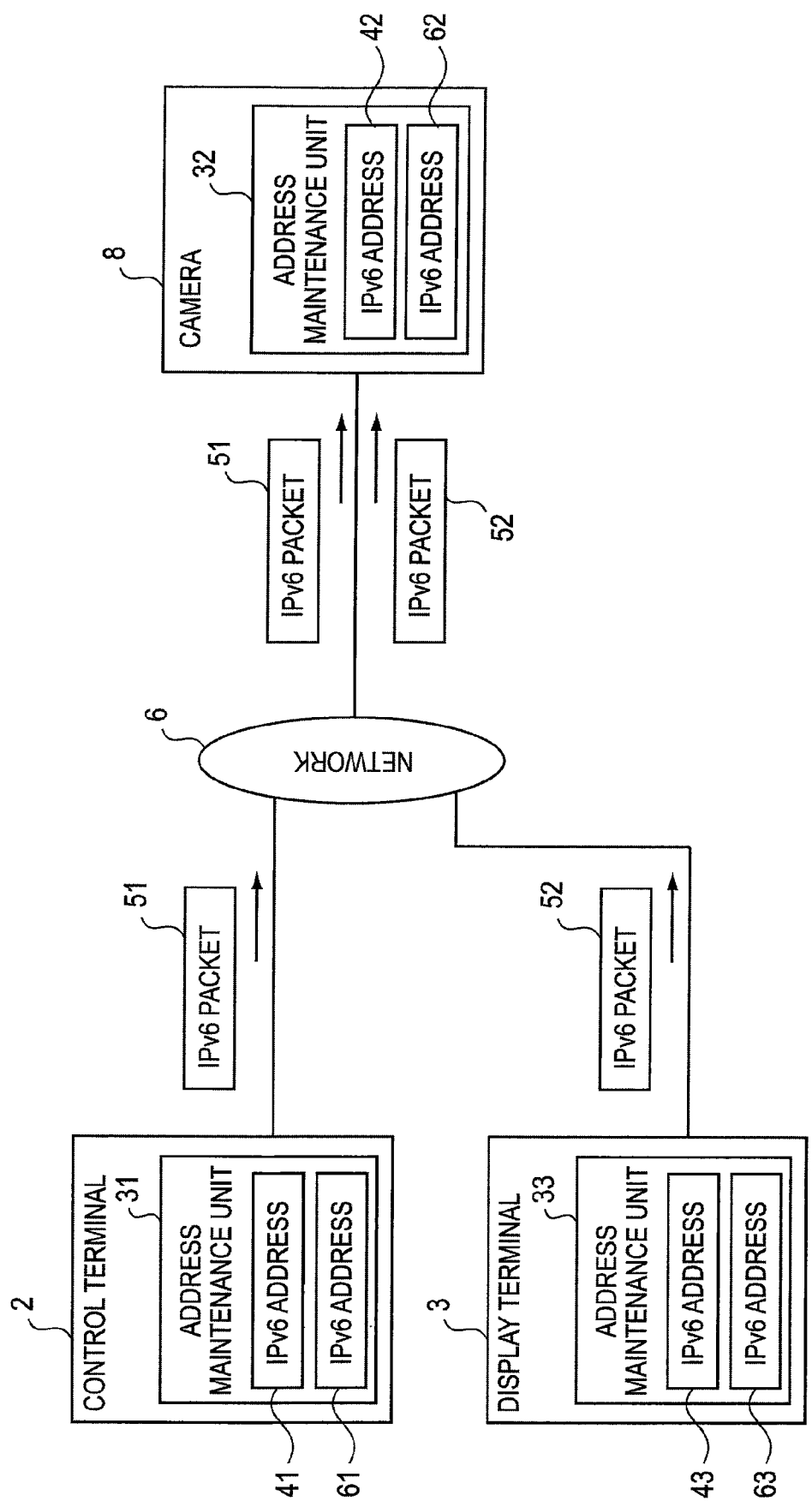

NETWORK DEVICE AND NETWORK DEVICE MANAGING METHOD

TECHNICAL FIELD

The present invention relates to a network device and a network system performing address management on a network on the basis of IPv6 (Internet Protocol version 6) which is a communication protocol for general use on the Internet, and connected to the network using an IPv6 address and to an IPv6 address assigning method and a network device managing method.

BACKGROUND ART

In a network on the basis of IPv6, an IPv6 address which is assigned to a network device connected to the network is 128 bits long. Of them, the first-half 64 bits are allocated to a network prefix included in RA (Router Advertisement) from a router. The second-half 64 bits are allocated to an EUI-64 format interface ID as a 64-bit identifier decided by the IEEE.

In the EUI-64 format interface ID, an MAC address is encapsulated. In 64 bits of the entire interface ID, the former 24 bits are allocated to a number indicating a manufacturer administrated by the IEEE, the next 16 bits are allocated to "FFFE", and the latter 24 bits are allocated to an expanded identification number managed by a manufacturer.

The IPv6 address allocated in this manner ensures uniqueness in that the MAC address encapsulated in the interface ID is not overlapped and a unique number.

When a network device (control device) to which the IPv6 address is assigned controls another network device (controlled device), identification information of the controlled device managed by a database server on a network is referred to control access to the controlled device on the basis of the identification information of the controlled device.

In an IPv6 network system disclosed in Patent Document 1, filtering or high-level services in an IP packet transfer is functionally limited in accordance with a value of an interface ID contained in an IPv6 address of a device connected to a network. Accordingly, security is improved. Moreover, information indicating communication contents or a device attribute is contained in the interface ID, thereby performing communication control corresponding to the relevant attribute.

Patent Document 1: JP-A-2004-289782

DISCLOSURE OF THE INVENTION

Problem that the Invention is to Solve

However, the known method of managing an IPv6 address on the IPv6 network has a problem described below.

in each of the IPv6 addresses, the MAC address is decided by a network device maker at the time of device manufacture with a rule by which it is difficult to recognize network devices. For that reason, when access to the network devices is controlled by the IPv6 addresses on the basis of the identification information of the controlled device, a database server storing the identification information of all the network devices connected to the network has to be used. Moreover, there occurs a problem in that flexible IPv6 addresses cannot be assigned to the network devices.

On a network device side, it is necessary to provide a structure for registering the identification information of the devices in the database along with the IPv6 addresses.

When a password for a network administrator who can administer all functions of a network device is leaked to a general access user who can use only partial functions without distinction by the IPv6 address, there occurs a problem with security in that a person who is not the network administrator can operate the network device.

The invention is devised in view of the above-described circumstances and an object of the invention is to provide a network device and a network system capable of explicitly identifying network devices without providing a database server having an IPv6 address, and provide an IPv6 address assigning method and a network device managing method.

Another object of the invention is to provide a network device and a network system capable of constructing a high secure network and provide an IPv6 address assigning method and a network device managing method, since the network device as an access target can be managed in accordance with a management system of the network device such as a device type, a function, and a function.

Means for Solving the Problem

The prevention includes configurations described below.

(1) There is provided a network device which performs address management on a network on the basis of IPv6 and is connected to the network using an IPv6 address. The network device has the IPv6 address assigned so as to contain a number indicating a management system type of a device in a part of an interface ID of the IPv6 address.

With such a configuration, it is possible to uniquely identify the network device with reference to the IPv6 address without providing a database server having the Ipv6 address, since each device on the network can explicitly identifies a target network device on the basis of the management system of the device using the number indicating the management system type of the interface ID in the IPv6 address. For example, device type information is used in a case where the management system type is a device type and location information is used in a case where the management system type is a location. Accordingly, a communication protocol in an application layer can be simplified, since it is not necessary to transmit and receive information with the database server in order to identify the network device.

(2) There is provided the network device according to (1), in which the IPv6 address further contains a number indicating device type information on the device in a part of the interface ID. With such a configuration, it is possible to explicitly identify the target network device with reference to the IPv6 address on the basis of the number indicating the device type information of the interface ID in the IPv6 address. Moreover, a high secure network can be constructed, since the network device as an access target can be managed in accordance with the management system of the network device using the device type information.

(3) There is provided the network device according to (2), in which the IPv6 address further contains a number indicating function information on the device in a part of the interface ID. With such a configuration, it is possible to explicitly identify the target network device with reference to the IPv6 address on the basis of the number indicating the device type information and the number indicating the function information of the interface ID in the IPv6 address. Moreover, the high secure network can be constructed, since a control authority or the like can be set in every function and the network device as an access target can be managed in accordance with the management system of the network device using the function information.

(4) There is provided the network device according to (1), in which the IPv6 address further contains a number indicating location information on the device in a part of the interface ID. With such a configuration, it is possible to explicitly identify the target network device with reference to the IPv6 address on the basis of the number indicating the location information of the interface ID in the IPv6 address. Moreover, the high secure network can be constructed, since the network device as an access target can be managed in accordance with the management system of the network device using the location information.

(5) There is provided the network device according to (4), in which the IPv6 address further contains a number indicating function information on the device in a part of the interface ID. With such a configuration, it is possible to explicitly identify the target network device with reference to the IPv6 address on the basis of the number indicating the location information and the number indicating the function information of the interface ID in the IPv6 address. Moreover, the high secure-network can be constructed, since the control authority or the like can be set in every function and the network device as an access target can be managed in accordance with the management system of the network device using the function information.

(6) There is provided the network device according to (1), which has as the IPv6 address a plurality of IPv6 addresses having the interface IDs different from each other. With such a configuration, the plurality of IPv6 addresses can individually used in accordance with a control-side circumstance. Accordingly, it is possible to perform access, control, and the like with reference to the IPv6 address which is the most optimum management system in the network devices.

(7) There is provided the network device according to (6), which has as the IPv6 address a first IPv6 address which contains a number indicating device type information on the device in a part of the interface ID and a second IPv6 address which contains a number indicating location information on the device in a part of the interface ID. With such a configuration, the IPv6 address using the device type information and the IPv6 address using the location information can individually used in accordance with the control-side circumstance. Accordingly, it is possible to perform access, control, and the like with reference to the IPv6 address which is the most optimum management system in the network devices.

(8) There is provided a network system which includes the network device according to (2) and performs at least one of access and control by permitting inter-device communication using the number indicating the device type information in the interface ID. With such a configuration, it is possible to simplify a communication protocol such as a Web access protocol by using the IPv6 address containing the number indicating the device type information when access, control, and the like are performed on the target network device.

(9) There is provided a network system which includes the network device according to (3) and performs at least one of access and control by permitting inter-device communication using the number indicating the device type information and the number indicating the function information in the interface ID. With such a configuration, it is possible to perform controlling every function by using the IPv6 address containing the number indicating the function information when access, control, and the like are performed on the target network device.

(10) There is provided a network system which includes the network device according to (3) and which controls communication using the number indicating the device type information and the number indicating the function information in the interface ID, so that VPN is constructed by IPsec. With such a configuration, it is possible to construct the high secure network, since the network device as the access target can be managed on the basis of the device type and the function by using the IPv6 address containing the device type information and the function information.

(11) There is provided a network system which includes the network device according to (4) and performs at least one of access and control by permitting inter-device communication using the number indicating the location information in the interface ID. With such a configuration, it is possible to simplify a communication protocol such as the Web access protocol by using the IPv6 address containing the number indicating the location information when access, control, and the like are performed on the target network device.

(12) There is provided a network system which includes the network device according to (5) and performs at least one of access and control by permitting inter-device communication using the number indicating the location information and the number indicating the function information in the interface ID. With such a configuration, it is possible to perform the controlling on every function by using the IPv6 address containing the number indicating the function information when access, control, and the like are performed on the target network device.

(13) There is provided a network system which includes the network device according to (5) and which controls communication using the number indicating the location information and the number indicating the function information in the interface ID, so that VPN is constructed by IPsec. With such a configuration, it is possible to construct the high secure network, since the network device as the access target can be managed on the basis of the location and the function by using the IPv6 address containing the location information and the function information.

(14) There is provided a method of assigning an IPv6 address to a network device which performs address management on a network on the basis of IPv6. The method includes assigning the IPv6 address so as to contain a number indicating a management system type of a device in a part of an interface ID of the IPv6 address set in association with every target device.

With such a configuration, it is possible to uniquely identify the network device with reference to the IPv6 address without providing a database server having the Ipv6 address, since each device on the network can explicitly identifies a target network device on the basis of the management system of the device using the number indicating the management system type of the interface ID in the IPv6 address. For example, the device type information is used in a case where the management system type is the device type and location information is used in a case where the management system type is the location. Accordingly, a communication protocol in an application layer can be simplified, since it is not necessary to transmit and receive information with the database server in order to identify the network device.

(15) There is provided the IPv6 address assigning method according to (14), in which the IPv6 address further includes a number indicating device type information on the device for specifying the device in a part of the interface ID. With such a configuration, it is possible to explicitly identify the target network device with reference to the IPv6 address on the basis of the number indicating the device type information of the interface ID in the IPv6 address. Moreover, a high secure network can be constructed, since the network device as an access target can be managed in accordance with the management system of the network device using the device type information.

(16) There is provided the IPv6 address assigning method according to (15), in which the IPv6 address further contains a number indicating function information on the device belonging to the device in a part of the interface ID. With such a configuration, it is possible to explicitly identify the target network device with reference to the IPv6 address on the basis of the number indicating the device type information and the number indicating the function information of the interface ID in the IPv6 address. Moreover, the high secure network can be constructed, since a control authority or the like can be set in every function and the network device as an access target can be managed in accordance with the management system of the network device using the function information.

(17) There is provided the IPv6 address assigning method according to (14), in which the IPv6 address further contains a number indicating location information on the device for specifying the device in a part of the interface ID. With such a configuration, it is possible to explicitly identify the target network device with reference to the IPv6 address on the basis of the number indicating the location information of the interface ID in the IPv6 address. Moreover, the high secure network can be constructed, since the network device as an access target can be managed in accordance with the management system of the network device using the location information.

(18) There is provided the IPv6 address assigning method according to (17), in which the OPv6 address further contains a number indicating function information on the device in a part of the interface ID. With such a configuration, it is possible to explicitly identify the target network device with reference to the IPv6 address on the basis of the number indicating the location information and the number indicating the function information of the interface ID in the IPv6 address. Moreover, the high secure network can be constructed, since the control authority or the like can be set in every function and the network device as an access target can be managed in accordance with the management system of the network device using the function information.

(19) There is provided the IPv6 address assigning method according to (14), in which as the IPv6 address a plurality of IPv6 addresses having the interface IDs different from each other are assigned to one network device. With such a configuration, the plurality of IPv6 addresses can individually used in accordance with a control-side circumstance. Accordingly, it is possible to perform access, control, and the like with reference to the IPv6 address which is the most optimum management system in the network devices.

(20) There is provided the IPv6 address assigning method according to (19), in which as the IPv6 address a first IPv6 address which contains a number indicating device type information on the device in a part of the interface ID and a second IPv6 address which contains a number indicating location information on the device in a part of the interface ID are assigned to one network device. With such a configuration, the IPv6 address using the device type information and the IPv6 address using the location information can individually used in accordance with the control-side circumstance. Accordingly, it is possible to perform access, control, and the like with reference to the IPv6 address which is the most optimum management system in the network devices.

(21) There is provided a network device managing method including communicating with a network device having the IPv6 address according to (2) using the number indicating the device type information in the interface ID to perform at least one of access and control. With such a configuration, it is possible to simplify a communication protocol such as the Web access protocol by using the IPv6 address containing the number indicating the device type information when access, control, and the like are performed on the target network device.

(22) There is provided a network device managing method including communicating with a network device having the IPv6 address according to (3) using the number indicating the device type information and the number indicating the function information in the interface ID to perform at least one of access and control. With such a configuration, it is possible to perform controlling every function by using the IPv6 address containing the number indicating the function information when access, control, and the like are performed on the target network device.

(23) There is provided a network device managing method including controlling communication with a network device having the IPv6 address according to (3) using the number indicating the device type information and the number indicating the function information in the interface ID, so that VPN is constructed by IPsec. With such a configuration, it is possible to construct the high secure network, since the network device as the access target can be managed on the basis of the device type and the function by using the IPv6 address containing the device type information and the function information.

(24) There is provided a network device managing method including communicating with a network device having the IPv6 address according to (4) using the number indicating the location information in the interface ID to perform at least one of access and control. With such a configuration, it is possible to simplify a communication protocol such as the Web access protocol by using the IPv6 address containing the number indicating the location information when access, control, and the like are performed on the target network device.

(25) There is provided a network device managing method including communicating with a network device having the IPv6 address according to (5) using the number indicating the location information and the number indicating the function information in the interface ID to perform at least one of access and control. With such a configuration, it is possible to perform the controlling on every function by using the IPv6 address containing the number indicating the function information when access, control, and the like are performed on the target network device.

(26) There is provided a network device managing method including controlling communication with a network device having the IPv6 address according to (5) using the number indicating the location information and the number indicating the function information in the interface ID, so that VPN is constructed by IPsec. With such a configuration, it is possible to construct the high secure network, since the network device as the access target can be managed on the basis of the location and the function by using the IPv6 address containing the location information and the function information.

ADVANTAGE OF THE INVENTION

According to the invention, there is provided a network device, a network system, an IPv6 address assigning method, and a network device managing method capable of explicitly identifying the network devices without providing a database server having an IPv6 address.

According to the invention, there is provided the network device, the network system, the IPv6 address assigning method, and the network device managing method capable of constructing high secure network, since the network device as an access target can be managed in accordance with a management system of the network device such as a device type, a function, and a location.

BRIEF DESCRIPTION OF THE DRAWING

FIGS. 13A to 13C are diagrams illustrating an example of bit arrangement of the interface ID upon performing masking by the function ID.

FIG. 14 is a diagram illustrating a concept at the time of network communication using the IPv6 address according to a third embodiment.

DESCRIPTION OF REFERENCE NUMERALS AND SIGNS

1: MAINTENANCE TERMINAL
2: CONTROL TERMINAL
3, 4: DISPLAY TERMINAL
5, 7: ROUTER
6: NETWORK
8, 9: CAMERA
12: INTERFACE ID
14: MANAGEMENT ID
15: DEVICE ID
16: FUNCTION ID
17: DEVICE TYPE
18: PRODUCT TYPE
19: PRODUCT SERIAL NUMBER
25: LOCATION ID
27: LOCATION NAME TYPE
28: LOCATION INFORMATION
29: DEVICE NUMBER
31, 32, 33: ADDRESS STORAGE/MAINTENANCE UNIT
41, 42, 43, 61, 62, 63: IPV6 ADDRESS
51, 52: IPv6 PACKET

PREFERRED EMBODIMENTS FOR CARRYING OUT THE INVENTION

First Embodiment

Figure 1:
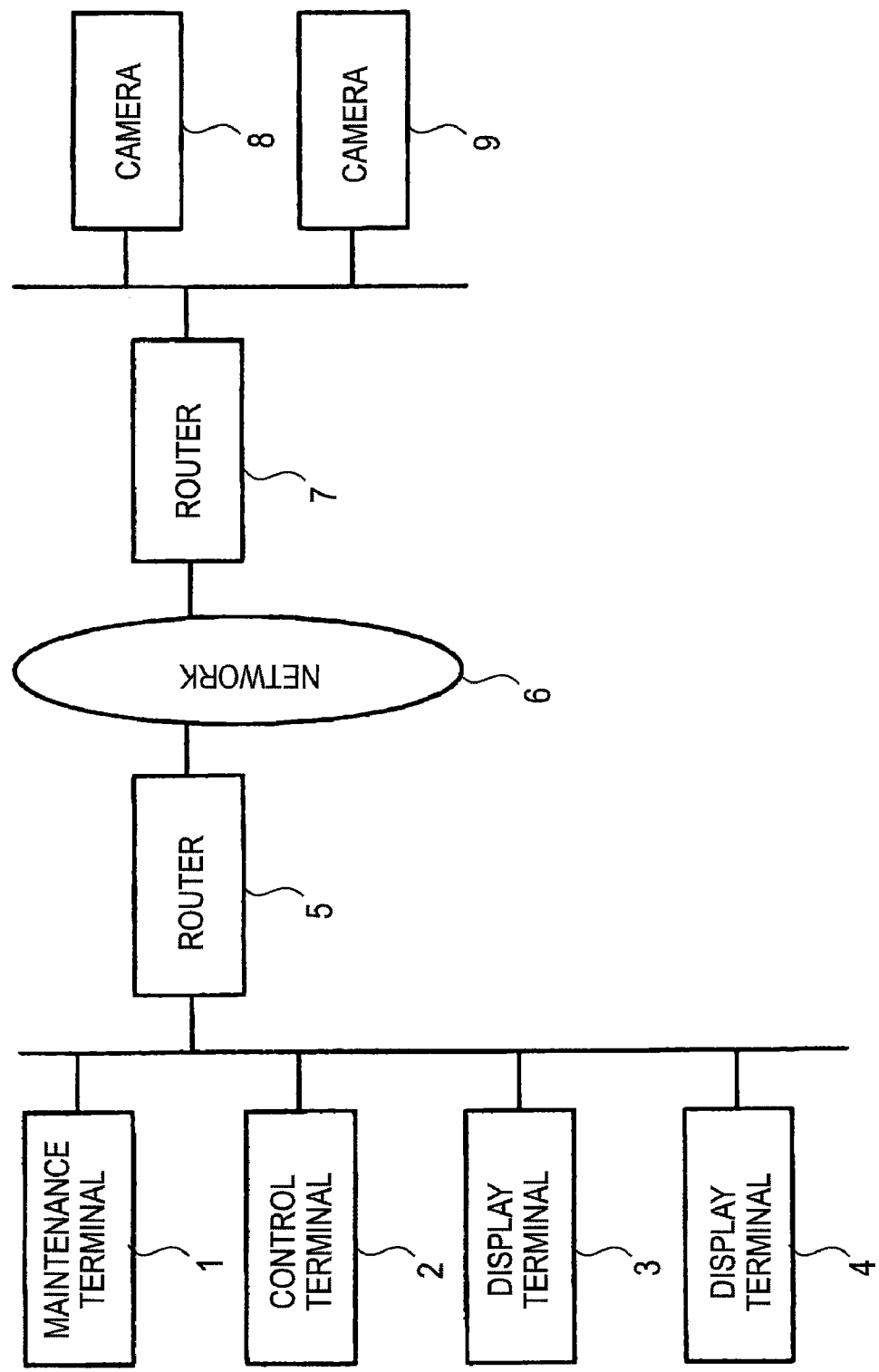
FIG. 1 is a diagram illustrating a configuration example of an IPv6 network system according to embodiments of the invention.

FIG. 1 is a diagram illustrating a configuration example of an IPv6 network system according to embodiments of the invention.

According to the embodiment, the IPv6 network system has a configuration in which a maintenance terminal 1, a control terminal 2, and display terminals 3 and 4 are connected to a network 6 such as the Internet capable of employing IPv6 through a router 5, and cameras 8 and 9 are connected to the network 6 through a router 7. Here, the maintenance terminal 1, the control terminal 2, the display terminals 3 and 4, the routers 5 and 7, and the cameras 8 and 9 are network devices which are connected to the IPv6 network and to which IPv6 addresses are assigned. The network devices are configured to manage addresses on the IPv6 network using IPv6 addresses and carry out communication, access control, and the like between the network devices.

Figure 2:
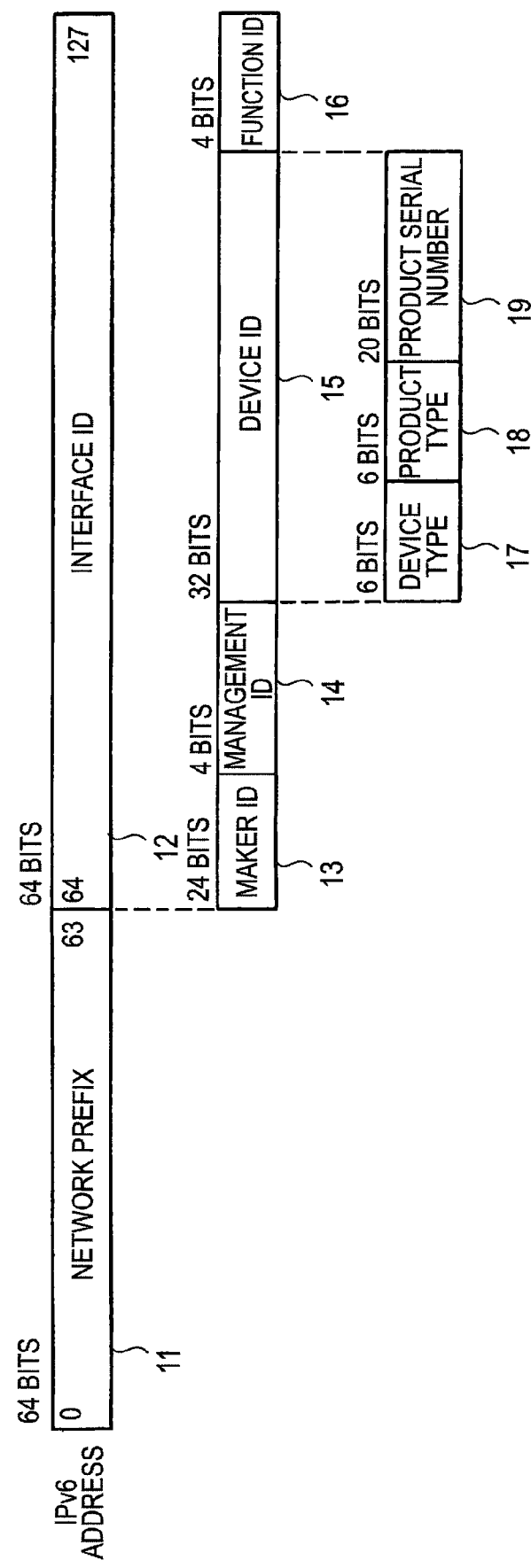
FIG. 2 is a diagram illustrating a structure of IPv6 addresses assigned to network devices according to a first embodiment.

FIG. 2 is a diagram illustrating a structure of the IPv6 addresses assigned to the network devices according to a first embodiment.

The IPv6 addresses has 128 bits long, and is composed of a first-half 64-bit network prefix 11 and a second-half 64-bit interface ID 12. In the first embodiment, the interface ID 12 has a maker ID 13, a management ID 14, a device ID 15, and a function ID 16. The management ID 14 corresponds to an example of a number indicating a management system type, the device ID 15 corresponds to an example of a number indicating device type information, and the function ID 16 corresponds to an example of a number indicating function information. When an IPv6 network system is constructed, the IPv6 addresses are set in every connected network device and memorized in the device or other devices to be used for network communication.

In the IPv6 network system, access to the camera 8 is permitted to perform various types of control by transmitting an IPv6 packet containing control information from the control device 2 to the camera 8, when the camera 8 is controlled by the control terminal 2, for example. The IPv6 packet includes a source IPv6 address indicating a source network device and a destination IPv6 address indicating a destination network device.

The former 24 bits of each MAC address held by network device makers are assigned to the maker ID 13 of the 64-bit interface ID 12. 4 bits indicating the management system type of a device are assigned to the management ID 14. In the first embodiment, information indicating the management by a device type is configured so as to be contained as the management system type. 6 bits indicating a device type 17, 6 bits indicating a product type 18, 20 bits indicating a product serial number 19 are assigned to the device ID 15. 4 bits indicating function of the network device is assigned to the function ID 16.

Figure 3:
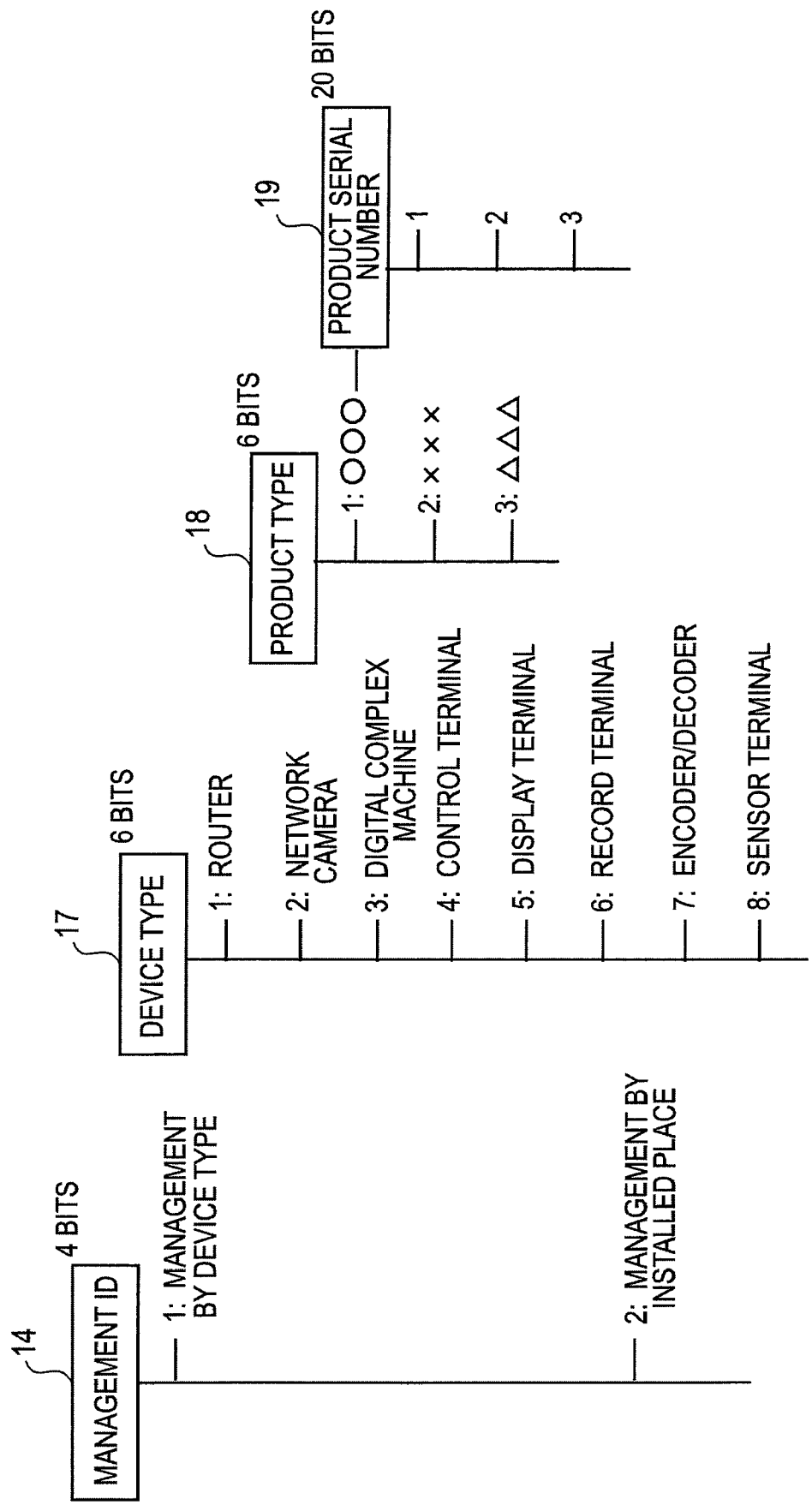
FIG. 3 is a diagram illustrating an example of setting items of a device type, a product type, and a product serial number when "1" indicating management by the device type is set in a management ID.

FIG. 3 is a diagram illustrating an example of setting items of the device type, the product type, and the product serial number when "1" indicating management by the device type is set in the management ID 14.

In the management ID 14, "1" indicating the management by the device type, "2" indicating management by an installed place, and the like can be set. In the first embodiment, "1" indicating the management by the device type is set.

When "1" indicating the management by the device type is set in the management ID 14, "1" indicating a router, "2" indicating a network camera, "3" indicating a digital complex machine, "4" indicating a control terminal, "5" indicating a display terminal, "6" indicating a record terminal, "7" indicating an encoder or a decoder, "8" indicating a sensor terminal, and the like can be set in the device type 17. When "2" indicating a network camera is set in the device type 17, "1" indicating "○○○", "2" indicating "xxx", "3" indicating "ΔΔΔ", and the like can be set in the product type 18. When "1" indicating "○○○" is set in the product type 18, "1", "2", "3", and the like indicating respective devices can be set in the product serial number 19.

Figure 4:
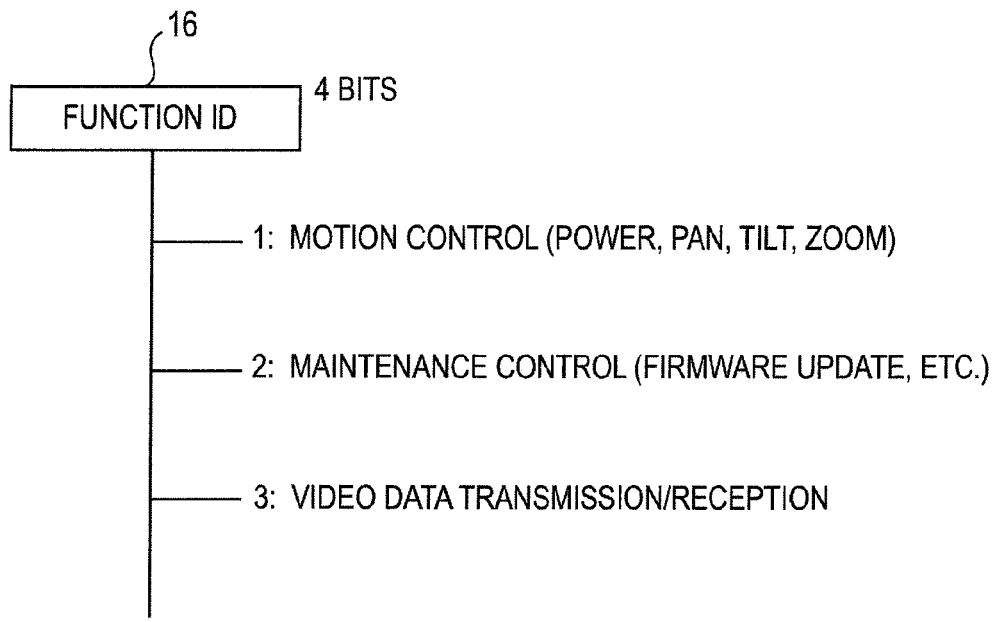
FIG. 4 is a diagram illustrating an example of setting items of a function ID when a number indicating a network camera is set in the device type.

FIG. 4 is a diagram illustrating an example of setting items of the function ID 16 when "2" indicating a network camera is set in the device type 17. In the function ID 16, "1" indicating motion control (power, pan, tilt, and zoom), "2" indicating maintenance control (firmware update, etc.), "3" indicating transmission/reception of video data, and the like can be set.

Here, operations of the IPv6 network system according to the first embodiment will be described. For example, when the control terminal 2 controls the camera 8, the source IPv6 address contained in the IPv6 packet transmitted from the control terminal 2 to the camera 8 is an IPv6 address of the control terminal 2 and the destination IPv6 address is an IPv6 address of the camera 8. The controlling of the camera 8 is performed by a Web access protocol such as HTTP, which is an upper-level service contained in the IPv6 packet, and the management ID 14, the device ID 15, and the function ID 16 assigned in the interface ID 12 of the IPv6 address of the camera 8, which is the destination IPv6 address.

That is, camera 8 recognizes the controlling as the management by the device type from the management ID 14 on the basis of the received IPv6 packet, recognizes the controlling as the control for the camera 8 itself from the device ID 15, and recognizes control details (control details by the upper-level service) from the function ID 16. On the other hand, the control terminal 2 appends information to the IPv6 packet to be transmitted and specifies the camera 8 using the device type 17, the product type 18, and the product serial number 19 contained in the device ID 15.

Specifically, when it is known in advance that the device type 17 of the camera 8 is a video camera (network camera), the product type 18 is ○○○ (specific product number), and the product serial number 19 is the number 1, the control terminal 2 specifies the camera 8 using the information of "the number 1 of a video camera ○○○". In this case, the product serial number 19 may not necessarily be a serial number allocated in manufacture by a network device maker, but may be a number or the like allocated in a sequence of inputting in a system, for example, as long as not overlapped.

Figure 5:
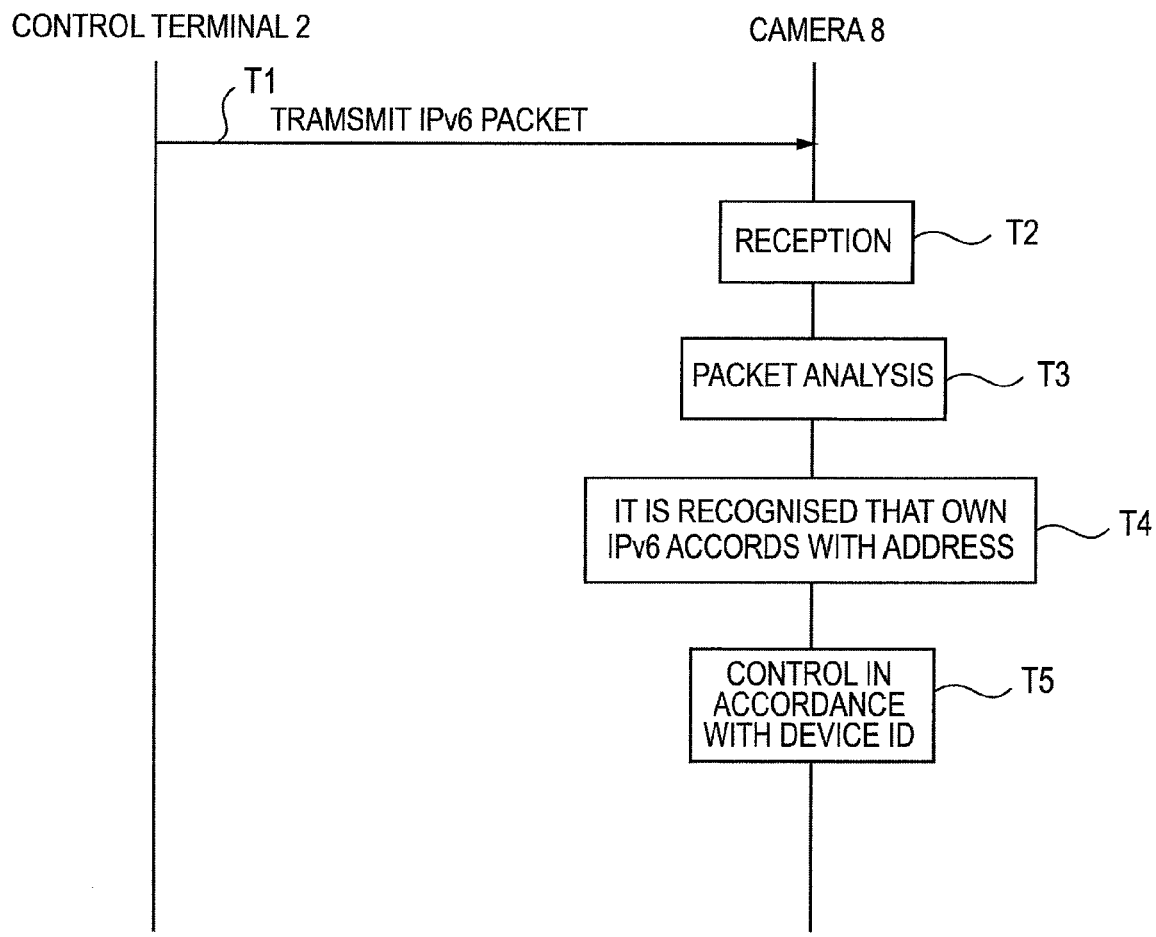
FIG. 5 is a diagram illustrating an operation sequence when a control terminal controls a camera according to the first embodiment.

In the IPv6 network system according to the first embodiment, the above description shows an example of the operations of the network device to which the IPv6 address is assigned. FIG. 5 is a diagram illustrating an operation sequence when the control terminal 2 controls the camera 8.

First, the control terminal 2 transmits the IPv6 packet for controlling the camera 8 (T1). In this case, the source IPv6 address contained in a header of the transmitted IPv6 packet is the IPv6 address of the control terminal 2, and the destination IPv6 address is the IPv6 address of the camera 8. Detailed information used to control the camera 8 by an upper-level service is contained in application data.

When receiving the above-described IPv6 packet through the IPv6 network (T2), the camera 8 analyzes the IPv6 packet (T3). The source IPv6 address is recognized to be the address of the control terminal 2 from the analysis result. When the parts other than the function ID 16 (the maker ID 13, the management ID 14, and the device ID 15) in the destination IPv6 address accord with those of the own IPv6 address, it is recognized as the IPv6 packet to be transmitted to itself (T4). Subsequently, a control process defined by the function ID 16 contained in the IPv6 packet is performed (T5).

Specifically, for example, when the camera 8 is fanned "rightward by 10°", the function ID 16 is an ID indicating "motion control" of the camera. Actually, the motion of the "rightward by 10°" is controlled by the Web access protocol or the like such as the HTTP as the upper-level service, which is contained in the application data.

When the display terminal 3 controls the camera 8, the source IPv6 address contained in the IPv6 packet transmitted from the display terminal 3 to the camera 8 is the IPv6 address of the display terminal 3, and the destination IPv6 address is the IPv6 address of the camera 8. The controlling of the camera 8 is performed by the Web access protocol such as the HTTP, which is the upper-level service contained in the IPv6 packet, and the management ID 14, the device ID 15, and the function ID 16 assigned in the interface ID 12 of the IPv6 address of the camera 8, which is the destination IPv6 address.

For example, the function ID 16 is an ID indicating "video data transmission/reception" for the camera 8, when the display terminal 3 "demands transmission of image data" of the camera 8. Actually, the operations of the "demand for the transmission of the image data" and the "transmitting of the image data" are performed by the Web access protocol such as the HTTP, which is the upper-level service, contained in the application data or a streaming protocol such as RTP.

Figure 6:
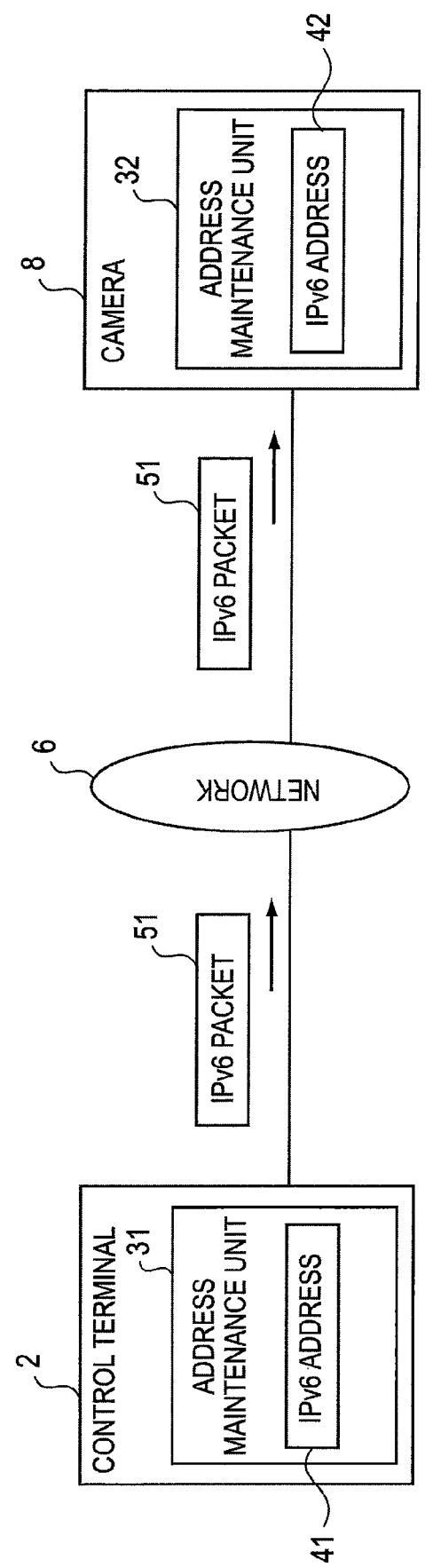
FIG. 6 is a diagram illustrating a concept at the time of network communication using the IPv6 address according to the first embodiment.

FIG. 6 is a diagram illustrating a concept at the time of network communication using the IPv6 address according to the first embodiment. In this case, the control terminal 2 controls the camera 8.

The network devices such as the control terminal 2 and the camera 8 connected to each other through the network 6 include address maintenance units 31 and 32 maintaining the IPv6 addresses set and assigned to the respective devices, respectively. The address maintenance unit 31 of the control terminal 2 keeps and maintains an IPv6 address 41 containing device type information of the own terminal. The address maintenance unit 32 of the camera 8 keeps and maintains an IPv6 address 42 containing device type information of the own terminal.

When the control terminal 2 controls the camera 8, a control unit of the control terminal 2 creates and transmits an IPv6 packet 51 containing address information which includes the IPv6 address 41 of the control terminal 2 as a source (control device) and the IPv6 address 42 of the camera 8 as a destination (controlled device) and control information. The IPv6 packet 51 is transmitted to the camera 8 through a communication path on the network 6. A control unit of the camera 8 analyzes the received IPv6 packet 51 and recognizes that the IPv6 packet is a packet for the own terminal transmitted from the control terminal 2 by the address information of the IPv6 addresses 41 and 42 to perform controlling the own terminal on the basis of the control information.

Upon controlling the network device, controlling performed by a device having no control authority can be excluded by adding the source IPv6 address of a device performing controlling to the control condition. Moreover, by using masking by the device ID, it is possible to perform consistent controlling on a plurality of target device such as all devices capable of "motion control", all video cameras capable of "motion control", or all video cameras ○○○ (restraining a product) capable of "motion control".

By permitting the router 7 to have an IPsec (Internet Protocol Security) function and performing the consistent controlling, it is possible to construct a secure VPN (Virtual Private Network) environment in all video cameras capable of "maintenance control" by the control terminal 2 and update a firmware, for example.

In this way, in a method of assigning the IPv6 addresses of the IPv6 network system and the network devices in the first embodiment, by allowing a bit field composed of the latter 40-bit interface ID to contain the management ID, the device ID, and the function ID, it is possible to realize a flexible address assigning method of explicitly identifying the network devices by the device type used as a device management system, while ensuring the unique interface ID of the IPv6 address. In this way, it is possible to identify the devices using the IPv6 addresses without employing a database server. Accordingly, a communication protocol can be simplified since a sequence for transmitting and receiving information to and from the database server is not necessary in an application layer.

It is possible to construct the VPN environment using the IPsec and thus improve network security, since the access to the network devices can be controlled using the device type, the product type, the product serial number, or the function ID.

The bit number, the bit arrangement, and the bit location in the management ID 14, the device ID 15, the function ID 16, the device type 17, the product type 18, and the product serial number 19 shown in FIG. 2 are just an example, and thus optimized on the basis of the size of a network, a system, a device, or the like, as long as the interface ID is not overlapped in all the network devices. For example, when the VPN environment is constructed using the IPsec in all devices having the same function ID 16, the function ID 16 may be located ahead of the device ID 15.

Second Embodiment

Figure 7:
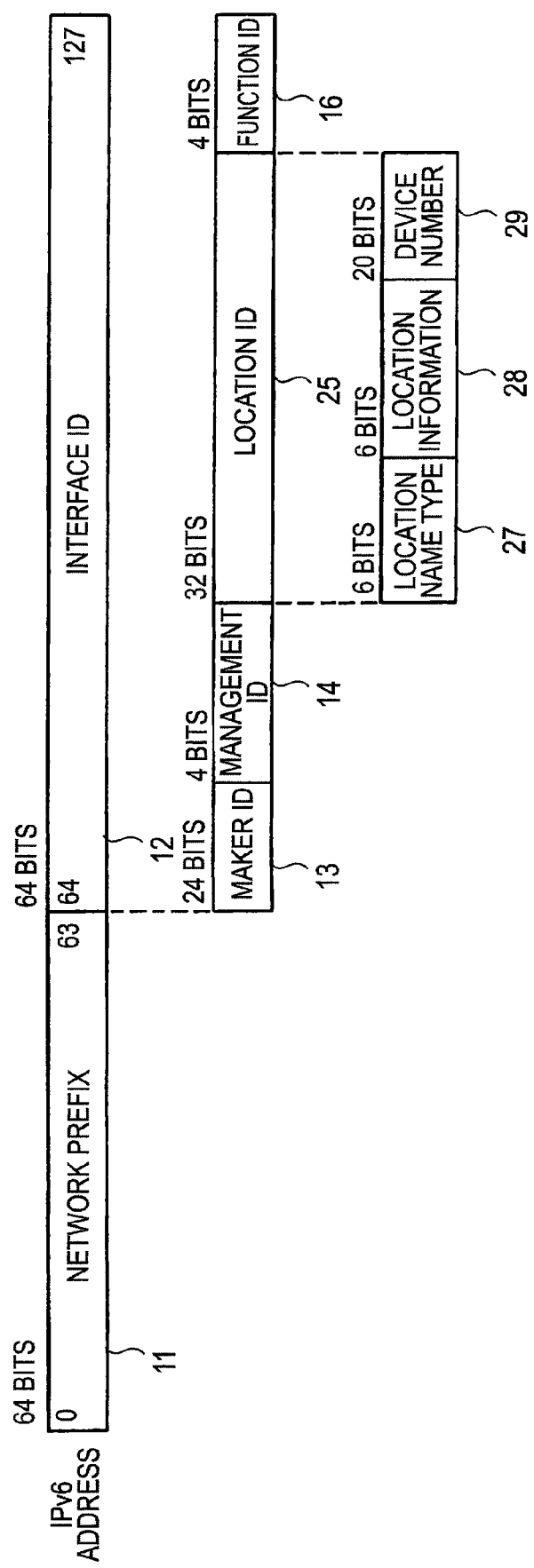
FIG. 7 is a diagram illustrating a structure of IPv6 addresses assigned to network devices according to a second embodiment.

FIG. 7 is a diagram illustrating a structure of an IPv6 address assigning to a network device according to a second embodiment.

In an IPv6 network system according to the second embodiment, an IPv6 address different from the IPv6 address according to the first embodiment is assigned to a network device. Since the configuration of the IPv6 network system is the same as that in the first embodiment, the same reference numerals are given and the description is omitted.

The IPv6 address is 128 bits long and composed of a first-half 64-bit network prefix 11 and a second-half 64-bit interface ID 12. In the second embodiment, the interface ID 12 is composed of a maker ID 13, a management ID 14, a location ID 25, and a function ID 16. The management ID 14 corresponds to an example of a number indicating a management system type, the location ID 25 corresponds to an example of a number indicating location information, and the function ID 16 corresponds to an example of a number indicating function information. When an IPv6 network system is constructed, the IPv6 addresses are set in every connected network device and memorized in the device or other devices to be used for network communication.

The former 24 bits of each MAC address held by network device makers are assigned to the maker ID 13 of the 64-bit interface ID 12. 4 bits indicating the management system type of a device are assigned to the management ID 14. In the second embodiment, information indicating the management by an installed place (location) is configured so as to be contained as the management system type. 8 bits indicating a location name type 27, 20 bits indicating location information 28, 4 bits indicating a device serial number 29 are assigned to the location ID 25. 4 bits indicating function of the network device is assigned to the function ID 16.

Figure 8:
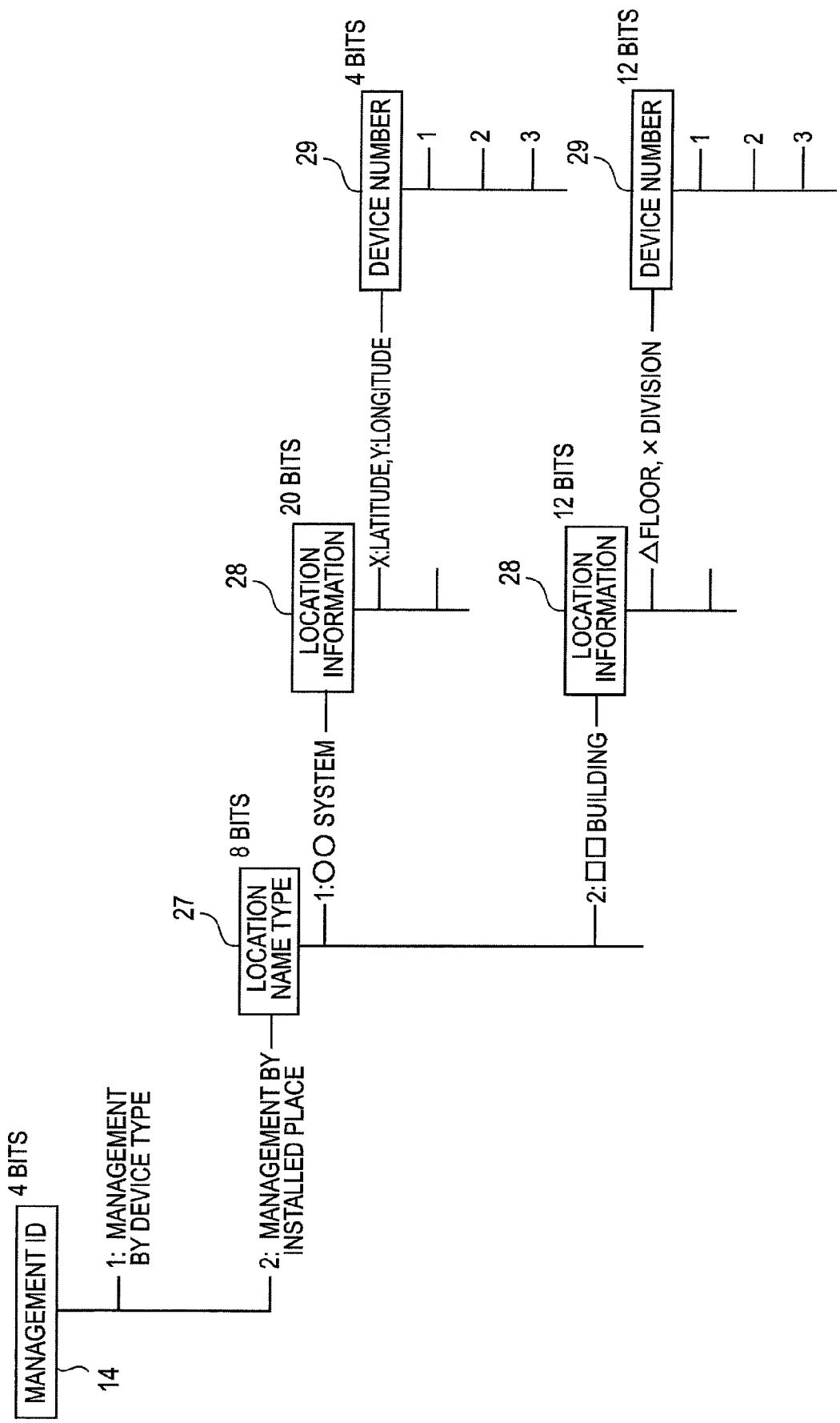
FIG. 8 is a diagram illustrating an example of setting items of a location name type, location information, and a device number when a number indicating management by the installed place is set in the management ID.

FIG. 8 is a diagram illustrating an example of setting items of the location name type, the location information, and the device number when "2" indicating management by the installed place is set in the management ID 14.

In the second embodiment, "2" indicating the management by the installed place is set in the management ID 14. When "2" indicating the management by the installed place is set in the management ID 14, "1" indicating "a ○○ system", "2" indicating "□□ building", and the like can be set in the location name type 27.

When "1" indicating "the ○○ system" is set in the location name type 27, latitude information "x" indicating a latitude, longitude information "y" indicating a longitude, and the like can be sent in the location information 28. When the latitude information "x" indicating a latitude and the longitude information "y" indicating a longitude can be sent in the location information 28, "1", "2", "3", and the like indicating respective devices are set in the device number 29. In addition, when "2" indicating "the □□ building" is set in the location name type 27, floor information "Δ floor" indicating a floor, division information "x division" indicating a division in the floor, and the like can be set in the location information 28. When the floor information "Δ floor" and the division information "x division" are set in the location information 28, "1", "2", "3", and the like indicating respective devices are set in the device number 29. Moreover, the same values (see FIG. 4) as those in the first embodiment may be set in setting items of the function ID 16.

Here, operations of the IPv6 network system according to the second embodiment will be described. For example, when the control terminal 2 controls the camera 8, the source IPv6 address contained in the IPv6 packet transmitted from the control terminal 2 to the camera 8 becomes an IPv6 address of the control terminal 2 and the destination IPv6 address becomes an IPv6 address of the camera 8. The controlling of the camera 8 is performed by a Web access protocol such as HTTP, which is an upper-level service contained in the IPv6 packet, and the management ID 14, the location ID 25, and the function ID 16 assigned in the interface ID 12 of the IPv6 address of the camera 8, which is the destination IPv6 address.

That is, camera 8 recognizes the controlling as the management by the installed place from the management ID 14 on the basis of the received IPv6 packet, recognizes the controlling as the control for the camera 8 itself from the location ID 25, and recognizes control details (control details by the upper-level service) from the function ID 16. On the other hand, the control terminal 2 appends information to the IPv6 packet to be transmitted and specifies the camera 8 using the location name type 27, the location information 28, and the device number 29 contained in the device ID 25.

Specifically, when it is known in advance that the location name type 27 of the camera 8 is "the □□ building", the location information is the x division (where x is information of coordinates indicating a location) of the Δ floor, and the device number is 1, the control terminal 2 specifies the camera 8 using the information of "the number 1 camera located in the x division on the Δ floor of the □□ building".

Figure 9:
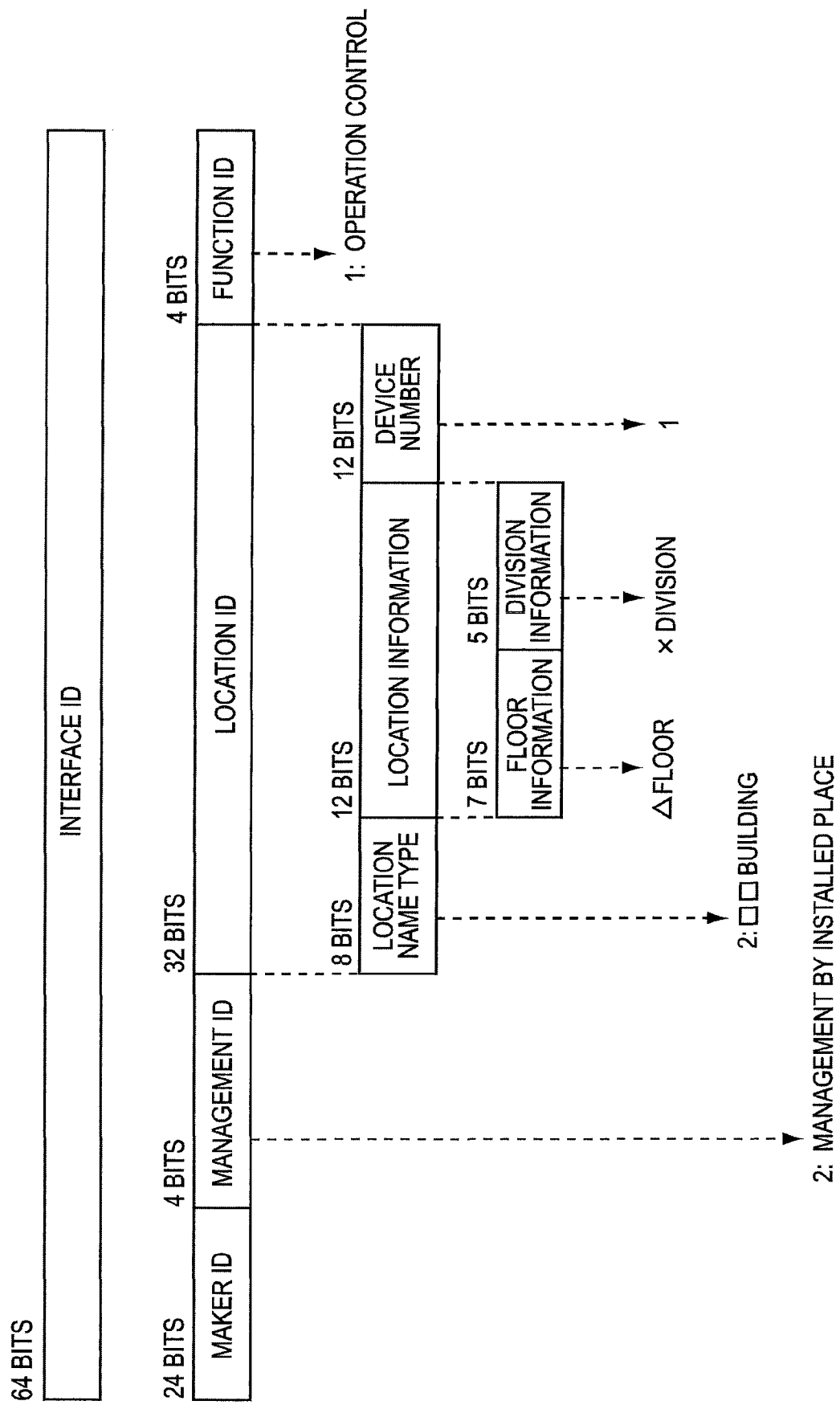
FIG. 9 is a diagram illustrating a first example of details set in an interface ID according to the second embodiment.

FIG. 9 is a diagram illustrating a first example of details set in the interface ID according to the second embodiment. In the first example, the floor information and the division information are used as the location information. In this case, the management ID 14 indicates management by the installed place, the location name type 27 indicates the □□ building, the floor information of the former 7 bits of the location information 28 indicates the Δ floor, and the division information of the latter 5 bits indicates the x division. In addition, the device number 29 indicates the number 1 and the function ID 16 indicates operation control.

Figure 10:
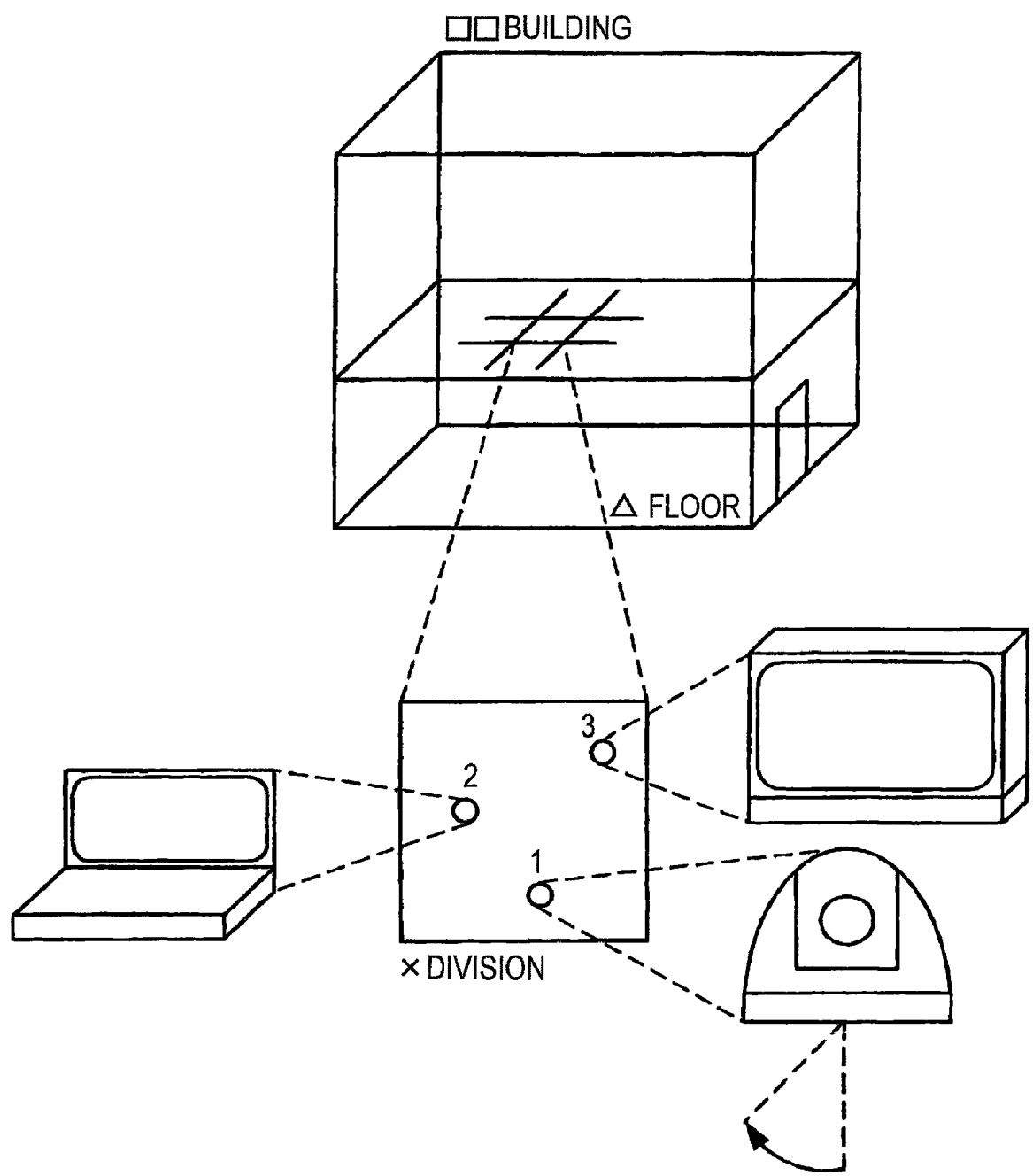
FIG. 10 is a diagram illustrating an example of the installed place of the network device which is specified by the IPv6 address of the first example shown in FIG. 9.

FIG. 10 is a diagram illustrating an example of the installed place of the network device in the □□ building, which is specified by the IPv6 address of the first example shown in FIG. 9. As shown in FIG. 10, the respective network devices are specified on the basis of the location ID contained in the IPv6 address, when the respective network devices having the device number 1, 2, and 3 are installed in the x division on the Δ floor of the □□ building.

As the location information, a unique number may be given to every location name type. Latitude and longitude coordinate information may be used as the location coordinates by GPS or the like in a case of a location name where the network device is configured in a limited outside division, for example. For example, when each unit of the network device is installed in four directions at a distance of 1 m at the division in four directions at a distance of 1 km, the network devices can be individually recognized by assigning 10 bits to the latitude information and the longitude information.

Figure 11:
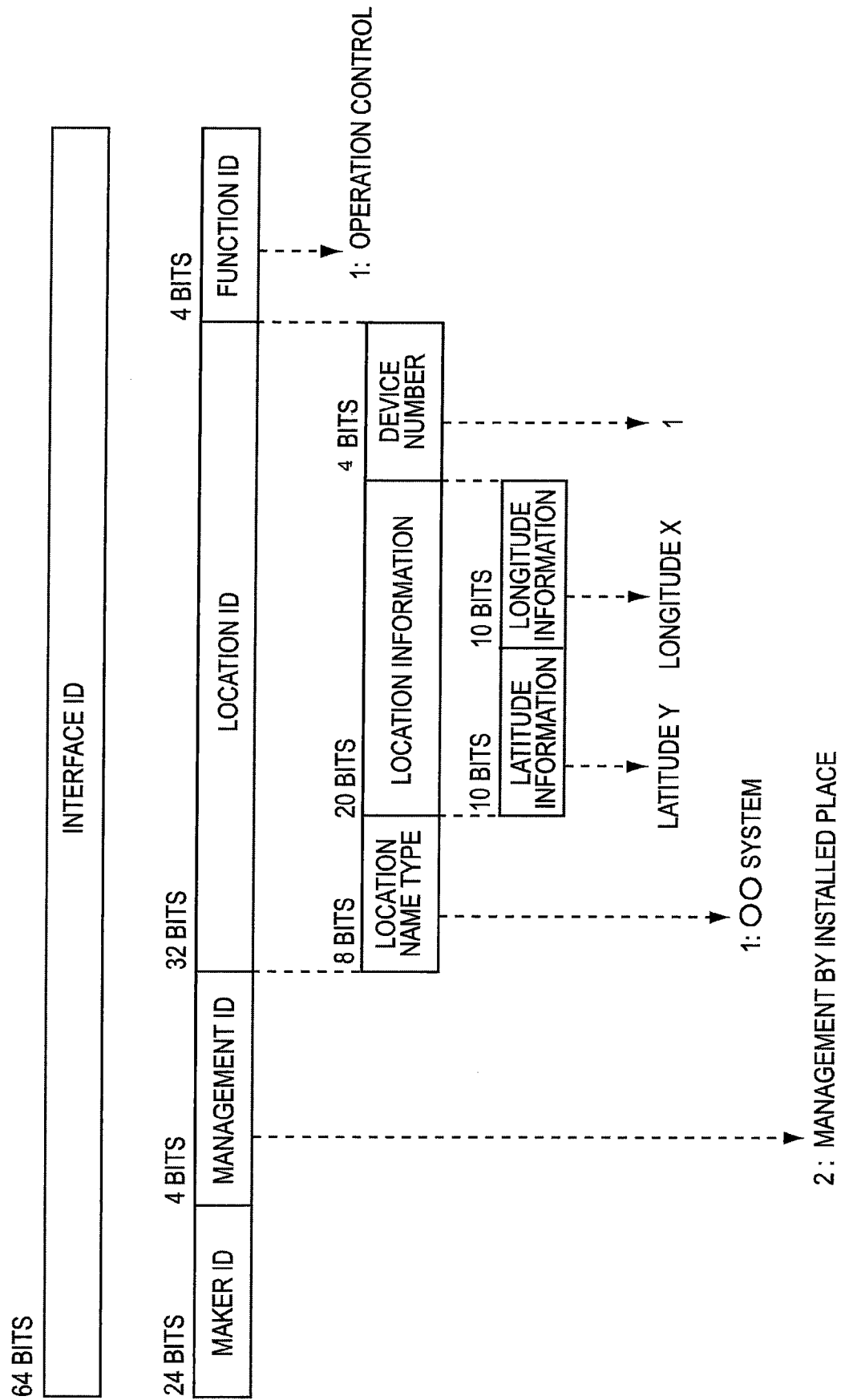
FIG. 11 is a diagram illustrating a second example of details set in the interface ID according to the second embodiment.

FIG. 11 is a diagram illustrating a second example of details set in the interface ID according to the second embodiment. In the second example, the latitude information and the longitude information are used as the location information. In this case, the management ID 14 indicates the management by the installed place, the location name type 27 indicates the ○○ system, the former 10-bit latitude information of the location information 28 indicates the latitude y, and the latter 10-bit longitude information indicates the longitude x. In addition, the device number 29 indicates the number 1 and the function ID 16 indicates the operation control.

Figure 12:
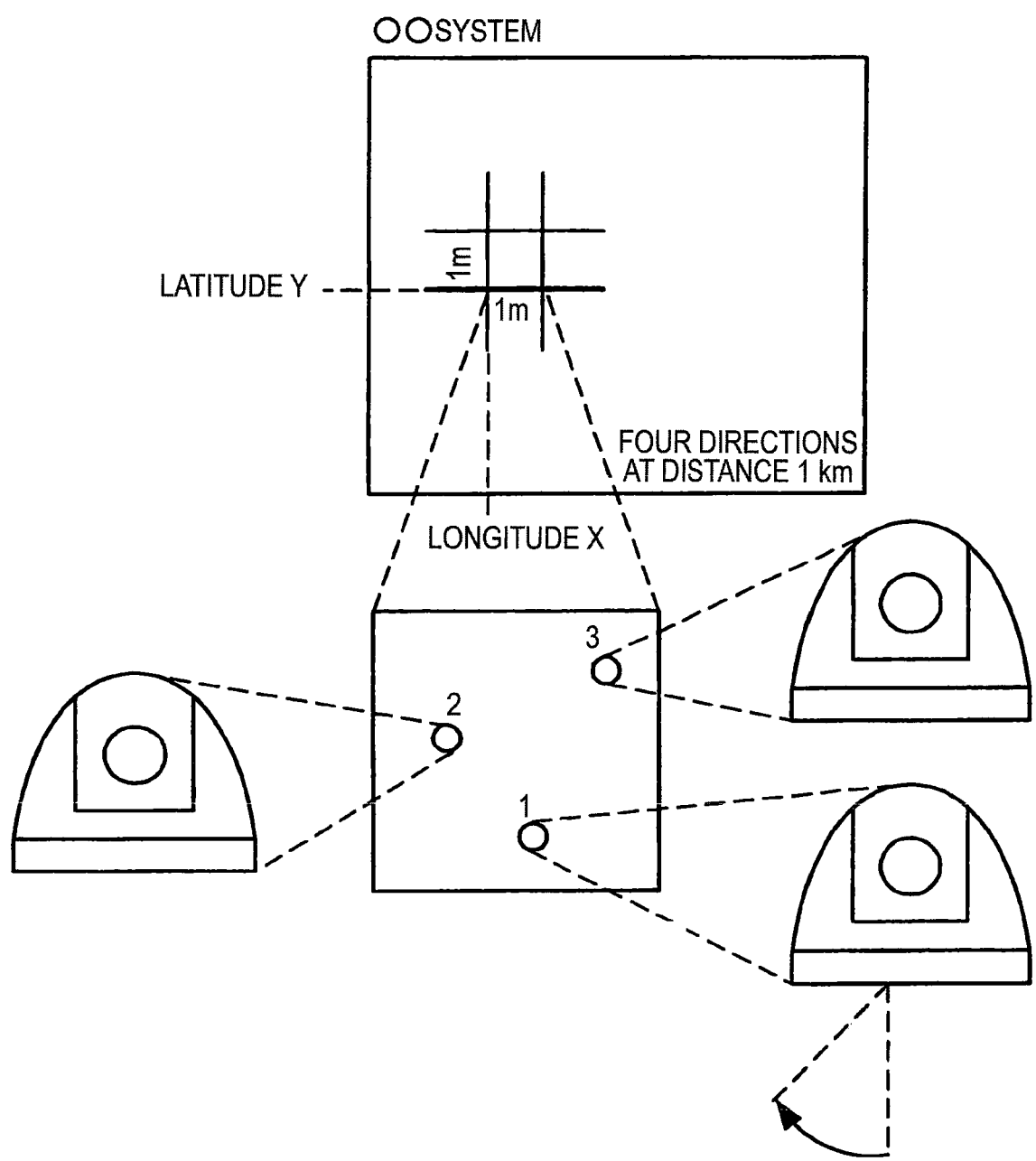
FIG. 12 is a diagram illustrating an example of the installed place of the network device which is specified by the IPv6 address of the second example shown in FIG. 11.

FIG. 12 is a diagram illustrating an example of the installed place of the network device in the ○○ system which is specified by the IPv6 address of the second example shown in FIG. 11. As shown in FIG. 12, the network devices are each specified on the basis of each location ID contained in the IPv6 address, when the network devices of the device numbers 1, 2, and 3 are installed at the division in the four direction at the distance 1 km which lies at a reference point of the latitude y and the longitude x in the ○○ system.

In a case of the location name where one unit or less of the network device is installed globally in four directions at a distance of 30 km, the network device can be uniquely identified by assigning 15 bits to the longitude information and 14 bits to the latitude information.

In the IPv6 network system according to the second embodiment, operations of the network device to which the above IPv6 address is assigned is the same as those in the first embodiment described above (see FIG. 5).

First, the control terminal 2 transmits the IPv6 packet for controlling the camera 8 (T1). In this case, the source IPv6 address contained in a header of the transmitted IPv6 packet is the IPv6 address of the control terminal 2, and the destination IPv6 address is the IPv6 address of the camera 8. Detailed information used to control the camera 8 by an upper-level service is contained in application data.

When receiving the above-described IPv6 packet through the IPv6 network (T2), the camera 8 analyzes the IPv6 packet (T3). The source IPv6 address is recognized to be the address of the control terminal 2 from the analysis result. When the parts other than the function ID 16 (the maker ID 13, the management ID 14, and the location ID 25) in the destination IPv6 address accord with those of the own IPv6 address, it is recognized as the IPv6 packet to be transmitted to itself (T4). Subsequently, a control process defined by the function ID 16 contained in the IPv6 packet is performed (T5).

Specifically, for example, when the camera 8 is fanned "rightward by 10°", the function ID 16 is an ID indicating "motion control" of the camera. Actually, the motion of the "rightward by 10°" is controlled by the Web access protocol or the like such as the HTTP as the upper-level service, which is contained in the application data.

When the display terminal 3 controls the camera 8, the source IPv6 address contained in the IPv6 packet transmitted from the display terminal 3 to the camera 8 is the IPv6 address of the display terminal 3, and the destination IPv6 address is the IPv6 address of the camera 8. The controlling of the camera 8 is performed by the Web access protocol such as the HTTP, which is the upper-level service contained in the IPv6 packet, and the management ID 14, the location ID 25, and the function ID 16 assigned in the interface ID 12 of the IPv6 address of the camera 8, which is the destination IPv6 address.

For example, the function ID 16 is an ID indicating "video data transmission/reception" for the camera 8, when the display terminal 3 "demands transmission of image data" of the camera 8. Actually, the operations of the "demand for the transmission of the image data" and the "transmitting of the image data" are performed by the Web access protocol such as the HTTP, which is the upper-level service, contained in the application data or a streaming protocol such as RTP.

Upon control the network device, controlling performed by a device having no control authority can be excluded by adding the source IPv6 address of a device performing controlling to the control condition. In addition, masking may be performed by the function ID.

FIGS. 13A to 13C are diagrams illustrating examples of bit arrangement of the interface ID upon performing the masking by the function ID. In FIG. 13A, the function ID is arranged behind the location name type. In this case, the masking by the function can be performed on entire terminals of a specific location name. In FIG. 13B, the function ID is arranged behind the floor information. In this case, the masking by the function can be performed on entire terminals of the specific location name and the floor. In FIG. 13C, the function ID is arranged behind the division information. In this case, the masking by the function can be performed on entire terminals of the specific location name, the floor, and the division.

In this way, in a method of assigning the IPv6 addresses of the IPv6 network system and the network devices in the second embodiment, by allowing a bit field composed of the latter 40-bit interface ID to contain the management ID, the location ID, and the function ID, it is possible to realize a flexible address assigning method of explicitly identifying the network devices by the installed place used as a device management system, while ensuring the unique interface ID of the IPv6 address. In this way, like the first embodiment, it is possible to identify the devices using the IPv6 addresses without employing a database server. Accordingly, a communication protocol can be simplified since a sequence for transmitting and receiving information to and from the database server is not necessary in an application layer.

It is possible to construct the VPN environment using the IPsec and thus improve network security, since the access to the network devices can be controlled using the location name type, the location information, the device number, or the function ID.

The bit number, the bit arrangement, and the bit location in the management ID 14, the location ID 25, the function ID 16, the location name type 27, the location information 28, and the device number 29 shown in FIG. 7 are just an example, and thus optimized on the basis of the size of a network, a system, a location name, or the like, as long as the interface ID is not overlapped in all the network devices. For example, when the VPN environment is constructed using the IPsec in all devices having the same function ID 16, the function ID 16 may be located ahead of the location ID 25.

Third Embodiment

In an IPv6 network system according to a third embodiment, both the IPv6 address according to the first embodiment and the IPv6 address according to the second embodiment are assigned to one network device. Since the configuration of the IPv6 network system is the same as that in the first embodiment, the same reference numerals are given and the description is omitted.

In the third embodiment, it is possible to simultaneously perform different control processes by distinguishing and using the IPv6 addresses by the network device performing control or a control function, when the two IPv6 addresses having the above-described different structures are assigned to one network device.

Here, operations of the IPv6 network system according to the third embodiment will be described. For example, the control terminal 2 controls the camera 8 using the IPv6 containing the device ID described in the first embodiment and the display terminal 3 controls the camera 8 using the IPv6 address containing the location ID described in the second embodiment.

When the control terminal 2 controls the camera 8, the source IPv6 address contained in the IPv6 packet transmitted from the control terminal 2 to the camera 8 is an IPv6 address of the control terminal 2 and the destination IPv6 address is an IPv6 address of the camera 8. The controlling of the camera 8 is performed by a Web access protocol such as HTTP, which is an upper-level service contained in the IPv6 packet, and the management ID 14, the device ID 15, and the function ID 16 assigned in the interface ID 12 of the IPv6 address of the camera 8, which is the destination IPv6 address.

As a specific example of the device ID 15, when it is known in advance that the device type 17 of the camera 8 is a video camera (network camera), the product type 18 is ○○○ (specific product number), and the product serial number 19 is the number 1, the control terminal 2 specifies the camera 8 using the information of "the number 1 of a video camera ○○○".

As a specific example of the function ID 16, when the camera 8 is fanned "rightward by 10°", the function ID 16 is an ID indicating "motion control" of the camera. Actually, the motion of the "rightward by 10°" is controlled by the Web access protocol or the like such as the HTTP as the upper-level service, which is contained in the application data.

When the display terminal 3 controls the camera 8, the source IPv6 address contained in the IPv6 packet transmitted from the display terminal 3 to the camera 8 is the IPv6 address of the display terminal 3, and the destination IPv6 address is the IPv6 address of the camera 8. The controlling of the camera 8 is performed by the Web access protocol such as the HTTP, which is the upper-level service contained in the IPv6 packet, and the management ID 14, the location ID 25, and the function ID 16 assigned in the interface ID 12 of the IPv6 address of the camera 8, which is the destination IPv6 address.

As a specific example of the location ID 25, when it is known in advance that the location name type 27 of the camera 8 is "the □□ building", the location information is the x division (where x is information of coordinates indicating a location) of the A floor, and the device number is 1, the display terminal 3 specifies the camera 8 using the information of "the number 1 camera located in the x division on the A floor of the □□ building".

As a specific example of the function ID 16, the function ID 16 is an ID indicating "video data transmission/reception" for the camera 8, when the display terminal 3 "demands transmission of image data" of the camera 8. Actually, the operations of the "demand for the transmission of the image data" and the "transmitting of the image data" are performed by the Web access protocol such as the HTTP, which is the upper-level service, contained in the application data or a streaming protocol such as RTP.

FIG. 14 is a diagram illustrating a concept at the time of network communication using the IPv6 address according to the third embodiment. Here, the control terminal 2 controls the camera 8 using the IPv6 containing the device ID described in the first embodiment and the display terminal 3 controls the camera 8 using the IPv6 address containing the location ID described in the second embodiment.

The network devices such as the control terminal 2, the camera 8, and the display terminal 3 connected to each other through the network 6 include address maintenance units 31, 32, and 33 maintaining the IPv6 addresses set and assigned to the respective devices, respectively. The address maintenance unit 31 of the control terminal 2 keeps and maintains an IPv6 address 41 containing the device ID of the own terminal and an IPv6 address 61 containing the device ID of the own terminal. The address maintenance unit 32 of the camera 8 keeps and maintains an IPv6 address 42 containing the device ID of the own terminal and an IPv6 address 62 containing the device ID of the own terminal. The address maintenance unit 33 of the display terminal 3 keeps and maintains an IPv6 address 43 containing the device ID of the own terminal and an IPv6 address 63 containing the device ID of the own terminal.

When control terminal 2 controls the camera 8, communication is carried out using the IPv6 addresses 41, 42, and 43 containing the respective device type information. In this case, a control unit of the control terminal 2 creates and transmits an IPv6 packet 51 containing address information which includes the IPv6 address 41 of the control terminal 2 as a source (control device) and the IPv6 address 42 of the camera 8 as a destination (controlled device) and control information. The IPv6 packet 51 is transmitted to the camera 8 through a communication path on the network 6. A control unit of the camera 8 analyzes the received IPv6 packet 51 and recognizes that the IPv6 packet is a packet for the own terminal by the address information of the IPv6 addresses 41 and 42 to perform controlling the own terminal on the basis of the control information.

When display terminal 3 controls the camera 8, communication is carried out using the IPv6 addresses 61, 62, and 63 containing the respective device type information. In this case, a control unit of the display terminal 3 creates and transmits an IPv6 packet 52 containing address information which includes the IPv6 address 63 of the display terminal 3 as a source (control device) and the IPv6 address 62 of the camera 8 as a destination (controlled device) and control information. The IPv6 packet 52 is transmitted to the camera 8 through a communication path on the network 6. A control unit of the camera 8 analyzes the received IPv6 packet 52 and recognizes that the IPv6 packet is a packet for the own terminal transmitted from the display terminal 3 by the address information of the IPv6 addresses 62 and 63 to perform controlling the own terminal on the basis of the control information.

In this way, in a method of assigning the IPv6 addresses of the IPv6 network system and the network devices in the third embodiment, by assigning both the IPv6 address containing the management ID, the device ID, and the function ID and the IPv6 address containing the management ID the location ID, and the function ID in a bit field composed of the latter 40-bit interface ID to one network device, it is possible to perform optimum control of the network device, since the plurality of IPv6 addresses can be individually used in accordance with a circumstance of the network side performing the controlling.

The access can be controlled by the device type, the product type, the product serial number, or the function ID, when the IPv6 address containing the management ID, the device ID, and the function ID is used. Likewise, the access can be controlled by the location name type, the location information, the device number, or the function ID, when the IPv6 address containing the management ID, the location ID, and the function ID is used. Accordingly, it is possible to construct the VPN environment using the IPsec and thus improve network security.

The bit number, the bit arrangement, and the bit location in the management ID, the device ID, the function ID, the device type, the product type, and the product serial number are just an example. Likewise, the bit number, the bit arrangement, and the bit location in the management ID, the location ID, the function ID, the location name type, the location information, and the device number are just an example. Accordingly, the bit number, the bit arrangement, and the bit location are optimized on the basis of the size of a network, a system, a device, a location name or the like, as long as the interface ID is not overlapped in all the network devices.

The invention is not limited to the above-described embodiments, but may be modified into various forms.

In the above-described embodiments, for example, there are described the case of managing the device system using the device type information as the management system type and the case of managing the device system using the installed place information (location information). However, the invention is not limited to these management systems, but the device system may be managed sing time information or the like.

In the above-described embodiments, a management device which manages the network devices using the IPv6 addressed assigned to the network devices may be connected to a network, and thus it is possible to carry out flexible management of the network devices by the management ID of the IPv6 addresses.

The invention has been described with reference to the detailed and specific embodiments, but it should be understood that various modifications or amendments can be made without departing the spirit and scope of the invention to a person skilled in the art.

Priority is claimed on Japanese Patent Application (Patent Application No. 2006-109701), filed on Apr. 12, 2006, the contents of which are incorporated herein by reference.

INDUSTRIAL APPLICABILITY

According to the invention, it is possible to obtain an advantage of explicitly identifying network devices without providing a database server having an IPv6 address and an advantage of constructing a high secure network since the network devices as an access target can be managed on the basis of a management system of the network device such as a device type, a function, and a location. Moreover, it is useful for a network device and a network system connected to a network using the IPv6 addresses, an IPv6 address assigning method, and a network device managing method.

The invention claimed is:

1. A network device managing method on a controlled device having an IPv6 (Internet Protocol Version 6) address for performing address management on an IPv6 network, the method comprising:

assigning the IPv6 address to the controlled device, wherein:
the IPv6 address contains a number indicating a management system type of the controlled device and a maker ID which is a number indicating a manufacturer of a MAC address held by a network device maker in a part of an interface ID of the IPv6 address set in association with the controlled device,
the management system type comprises management by device type and management by installed place,
the manufacturer being administrated by the IEEE (Institute of Electrical and Electronics Engineers), and
the controlled device has as the IPv6 address a first IPv6 address which contains numbers indicating device information of the controlled device in a part of the interface ID when the number indicating the management by the device type is set in a management ID of the interface ID and a second IPv6 address which contains numbers indicating location information of the controlled device in a part of the interface ID when the number indicating the management by the installed place is set in the management ID;
when a control to the controlled device is performed by using the number indicating the management by the device type, generating and transferring a first IPv6 packet from a control terminal to the controlled device, the first IPv6 packet including control information and address information which has an IPv6 address of the control terminal device and the first IPv6 address of the controlled device;
when the control to the controlled device is performed by using the number indicating the management by the installed place, generating and transferring a second IPv6 packet from the control terminal to the controlled device, the second IPv6 packet including the control information and address information which has the IPv6 address of the control terminal and the second IPv6 address of the controlled device;
analyzing the first and second packets by the controlled device; and
operating the controlled device based on the control information.

2. An IPv6 (Internet Protocol Version 6) address management system including at least one control terminal and at least one controlled device connected via a IPv6 network for performing a method comprising steps of:

assigning an IPv6 address to the controlled device, wherein:
  the IPv6 address contains a number indicating a management system type of the controlled device and a maker ID which is a number indicating a manufacturer of a MAC address held by a network device maker in a part of an interface ID of the IPv6 address set in association with the controlled device,
  the management system type comprises management by device type and management by installed place,
  the manufacturer being administrated by the IEEE (Institute of Electrical and Electronics Engineers), and
  the controlled device has as the IPv6 address a first IPv6 address which contains numbers indicating device information of the controlled device in a part of the interface ID when the number indicating the management by the device type is set in a management ID of the interface ID and a second IPv6 address which contains numbers indicating location information of the controlled device in a part of the interface ID when the number indicating the management by the installed place is set in the management ID;

generating and transferring a first IPv6 packet from the control terminal to the controlled device when a control to the controlled device is performed by using the number indicating the management by the device type, the first IPv6 packet including control information and address information which has an IPv6 address of the control terminal and the first IPv6 address of the controlled device;

generating and transferring a second IPv6 packet from the control terminal to the controlled device when the control to the controlled device is performed by using the number indicating the management by the installed place, the second IPv6 packet including the control information and address information which has the IPv6 address of the control terminal and the second IPv6 address of the controlled device;

analyzing the first and second packets by the controlled device; and operating the controlled device based on the control information.

\* \* \* \* \*

UNITED STATES PATENT AND TRADEMARK OFFICE
CERTIFICATE OF CORRECTION

PATENT NO. : 7,779,111 B2 Page 1 of 1
APPLICATION NO. : 12/295105
DATED : August 17, 2010
INVENTOR(S) : Shiraiwa et al.

It is certified that error appears in the above-identified patent and that said Letters Patent is hereby corrected as shown below:

In column 1, line 55, please capitalize the letter "i" in the word "in",

In column 12, line 20, please insert the letter --a-- after the first italics and the square symbol, In column 16, line 10, please replace the letter "A" with a triangle symbol, In column 18, line 50, please delete the word "device" after the word "terminal" and before the word "and"

Signed and Sealed this

Sixteenth Day of November, 2010

David J. Kappos
*Director of the United States Patent and Trademark Office*